No. 709,165. Patented Sept. 16, 1902.
A. LINDSAY.
CUSPIDOR.
(Application filed Dec. 7, 1901.)
(No Model.)

Witnesses
M. S. Blondel
Clarence Shaw

Inventor
Alexander Lindsay.
By Mead & Co
Attorneys

UNITED STATES PATENT OFFICE.

ALEXANDER LINDSAY, OF WELLSVILLE, OHIO.

CUSPIDOR.

SPECIFICATION forming part of Letters Patent No. 709,165, dated September 16, 1902.

Application filed December 7, 1901. Serial No. 85,044. (No model.)

*To all whom it may concern:*

Be it known that I, ALEXANDER LINDSAY, a citizen of the United States, residing at Wellsville, in the county of Columbiana and State of Ohio, have invented a new and useful Cuspidor, of which the following is a specification.

This invention is an improvement in cuspidors, and has for its object to provide a simple device of attractive design in which the contents will be completely hidden, and also to provide a device that may be thoroughly and readily cleansed.

With these objects in view my invention consists of a base or bowl section to which is integrally formed a funnel-shaped receiver whose lower end terminates in a cone that is adapted to completely hide the contents of the bowl.

My invention also consists in certain features of construction and novel arrangements of parts, as will be fully described in the following specification and pointed out in the claims, reference being had to the drawings, in which—

Figure 1:
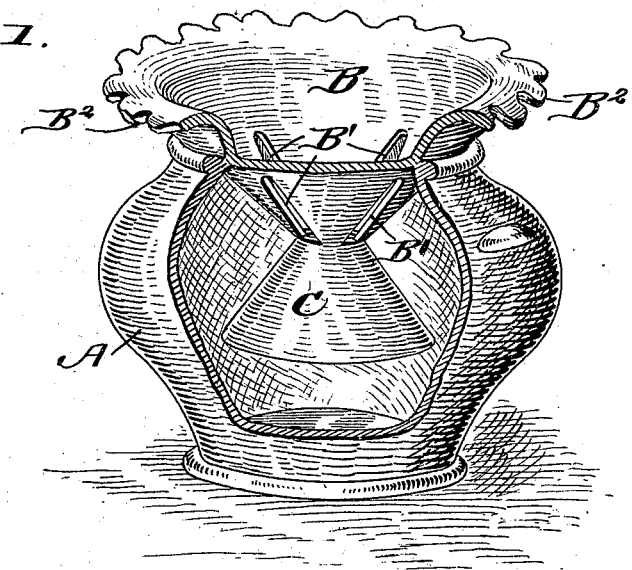
Figure 2:
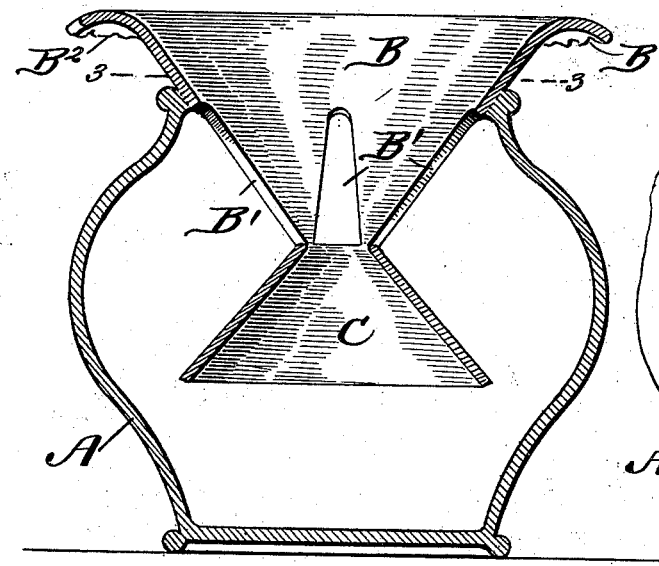
Figure 3:
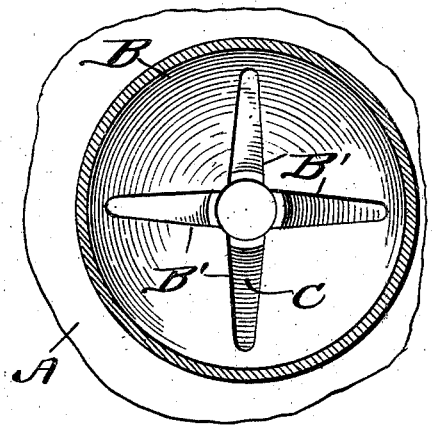

Figure 1 is a perspective view of my improvement with parts broken away to show the construction and arrangement of the interior. Fig. 2 is a vertical sectional view, and Fig. 3 is a cross-section taken about on the line 3 3 of Fig. 2.

In the drawings I have illustrated my improvement as made of pottery or china, although it will be of course understood that any material may be employed that may be found practical, and, as shown, I employ a bowl or jar A, to the rim of which is permanently fastened a funnel-shaped receiver B, whose inner end terminates in an outwardly-flaring or inverted-funnel-shaped section C, that extends down within the bowl or vessel, as clearly shown. The receiver B is provided with a series of slots or openings B', that extend from the point where the section C connects with the receiver up to a point adjacent the top of the base or bowl, as shown in Fig. 2. By this arrangement it will be readily seen that the cuspidor may be readily emptied and cleansed, and by arranging the slots in the receiver a smaller contacting surface is employed, which readily permits of the contents being delivered to the bowl and also reduces the surface to be exposed, and thereby greatly reducing the unsightly appearance of articles of the kind.

In practice when the cuspidor is made of pottery or china the bowl and receiver are made separately, after which the receiver is positioned within the bowl and caused to be held thereto by firing; but it will of course be understood that any other suitable means may be employed for uniting the said section, and I may also make the outer edge $B^2$ of the receiver with any suitable ornamental design, as desired.

Having thus fully described my invention, what I claim as new, and desire to secure by Letters Patent of the United States, is—

1. A cuspidor comprising a bowl having a receiver arranged thereon, the upper end of which projects above the said bowl and having its lower end contracted and slotted, the said lower end terminating in a flaring portion arranged below the said slots, substantially as shown and described.

2. A cuspidor comprising a bowl having a funnel-shaped receiver fixed thereon, the lower edge of which is open and having slots radiating from the said open end, and an inverted-funnel-shaped section projecting from the lower end of the receiver and formed integral therewith, the said section being arranged within the bowl, substantially as shown and described.

ALEXANDER LINDSAY.

Witnesses:
HENRY THOM,
JENNIE M. RILEY.